United States Patent
Yang

(10) Patent No.: US 8,826,044 B2
(45) Date of Patent: Sep. 2, 2014

(54) SWITCH DEVICE OF DATA CARD WITH BATTERY AND REALIZATION METHOD FOR SAVING POWER THEREOF

(75) Inventor: Chaojie Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 50 days.

(21) Appl. No.: 13/519,448

(22) PCT Filed: Apr. 21, 2011

(86) PCT No.: PCT/CN2011/073137
§ 371 (c)(1),
(2), (4) Date: Jun. 27, 2012

(87) PCT Pub. No.: WO2012/003736
PCT Pub. Date: Jan. 12, 2012

(65) Prior Publication Data
US 2012/0286590 A1    Nov. 15, 2012

(30) Foreign Application Priority Data
Jul. 7, 2010 (CN) .......................... 2010 1 0223501

(51) Int. Cl.
*G06F 1/00* (2006.01)
*G06F 1/26* (2006.01)
*H01M 10/42* (2006.01)
*G06F 1/32* (2006.01)

(52) U.S. Cl.
CPC .............. *H01M 10/42* (2013.01); *G06F 1/266* (2013.01); *H01M 10/425* (2013.01); *G06F 1/263* (2013.01); *Y02E 60/12* (2013.01); *G06F 1/3212* (2013.01)
USPC ........................... 713/300; 713/320; 713/324

(58) Field of Classification Search
None
See application file for complete search history.

(56) References Cited

U.S. PATENT DOCUMENTS

| 4,316,246 A * | 2/1982 | Hartley et al. ............... 713/340 |
| 2002/0031700 A1* | 3/2002 | Wruck et al. ................. 429/61 |
| 2003/0139207 A1 | 7/2003 | Yamazaki |
| 2008/0307142 A1* | 12/2008 | Sherman et al. ............. 710/301 |
| 2009/0168284 A1* | 7/2009 | Lohr et al. ..................... 361/92 |
| 2009/0181717 A1* | 7/2009 | Lo et al. ..................... 455/550.1 |

FOREIGN PATENT DOCUMENTS

| CN | 101527003 A | 9/2009 |
| CN | 101699690 A | 4/2010 |
| CN | 101887530 A | 11/2010 |
| WO | 2005/007855 A1 | 8/2005 |

OTHER PUBLICATIONS

PCT International Search Report for PCT/CN2011/073137 mailed Jul. 14, 2011 (6 pages).

* cited by examiner

*Primary Examiner* — Kim Huynh
*Assistant Examiner* — Vincent Chang
(74) *Attorney, Agent, or Firm* — Sutherland Asbill & Brennan LLP

(57) ABSTRACT

The present invention discloses a switch device of a data card with a battery comprising a connection detecting module and a battery connection enable switch-off module inside an original battery power supply module. The present invention further discloses a method for saving power of a data card with a battery. Using the switch device of the data card and corresponding method for saving power of the data card, a switch button of the data card can be omitted and static power consumption of the battery can be avoided, thereby saving electric quantity of the battery.

12 Claims, 2 Drawing Sheets

SWITCH DEVICE OF DATA CARD WITH BATTERY AND REALIZATION METHOD FOR SAVING POWER THEREOF

CROSS REFERENCE TO RELATED APPLICATIONS

This application claims the priority benefit of PCT/CN2011/073137 filed on Apr. 21, 2011 and Chinese Application No. 201010223501.8 filed on Jul. 7, 2010. The contents of these applications are hereby incorporated by reference in their entirety.

TECHNICAL FIELD

The present invention relates to the power saving technology in communication field, and more particularly, to a switch device of a data card with a battery and a method for saving power of the data card with the battery.

BACKGROUND OF THE RELATED ART

With the development of communication technologies, wireless communication technologies have developed from technologies such as Global System for Mobile Communications (GSM) or Code Division Multiple Access (CDMA) in their respective ways to Long Term Evolution (LTE) technologies. In order to meet market demands of various communication systems, the same data card is no longer applied to one type of communication system only, that is, a multi-mode data card integrated with a variety of communication systems has appeared on the market currently. With enhancement of functions of the data card and improvement of the transmission rate, requirements on the power of the data card are also increased. The demand of power of the data card is mainly concentrated in two operating modes, a standby mode and a data transfer mode. When the data card is in the standby mode, the corresponding transient current is about 5 mA to 10 mA; when data is transferred, the power is required to be relatively high, and the corresponding transient current is about 1.5 A to 2 A.

Existing data cards are mainly connected to computers via Universal Serial Bus (USB) interfaces, which are not only used as paths on which the data cards transfer data, but also used to supply power to the data cards. According to the USB 2.0 protocol standards and specifications, current which can be provided by a USB interface should not exceed 500 mA. The current provided by the USB interface can only satisfy power demands of single-mode data cards and some of multi-mode data cards, but can not satisfy power demands of other multi-mode data cards, and particularly, in particularly, can not satisfy the power demands of these multi-mode data cards during data transmission. Therefore, in implementation of functions of data cards, power of some of the data cards is supplemented by setting large energy storage capacitors in the data cards, and power of the other of the data cards is supplemented by setting batteries in the data cards.

Since the data cards are developed based on communication systems of mobile terminals, power-up and power-down processes of the data cards are similar to those of the mobile terminals. After a battery is added to a data card, a push-button switch is required to implement power-up and power-down operations of the data card. The addition of the push-button switch not only influences appearance of the data card, but also makes it is not simple and easy enough for a user to operate. In addition, after power-down of the current data card with the battery, because the battery is still connected to a function module of the data card, there is some static power consumption in the battery. If the data card is not used for a long time, electric quantity of the battery will be exhausted gradually, thereby shortening the battery life or damaging the battery.

SUMMARY OF THE INVENTION

In view of this, a main object of the present invention is to provide a switch device of a data card with a battery and a method for saving power of the data card with the battery so as to omit a switch button of the data card and avoid static power consumption of the battery, thereby saving electric quantity of the battery.

In order to achieve the object described above, the technical scheme of the present invention is implemented as follows.

The present invention provides a switch device of a data card with a battery comprising a connection detecting module and a battery connection enable switch-off module inside an original battery power supply module; wherein the connection detecting module is configured to detect whether the data card is connected to a computer, and control the battery connection enable switch-off module to switch on a battery circuit of the data card when determining that the data card is connected to the computer, and control the battery connection enable switch-off module to switch off the battery circuit of the data card when determining that the data card is disconnected from the computer; and the battery connection enable switch-off module is configured to switch on or off the battery circuit of the data card under control of the connection detecting module.

The connection detecting module detecting whether the data card is connected to the computer comprises the connection detecting module determining whether the data card is connected to the computer effectively by detecting whether a voltage of a computer interface is valid.

The connection detecting module controlling the battery connection enable switch-off module to switch on or off the battery circuit of the data card comprises:

the connection detecting module modulating a power supply voltage of the computer interface into a switch-on or switch-off control signal, the switch-on or switch-off control signal controlling the battery connection enable switch-off module to switch on or off the battery circuit of the data card.

The battery connection enable switch-off module switching on or off the battery circuit of the data card under the control of the connection detecting module comprises:

the battery connection enable switch-off module switching on or off the battery circuit of the data card when receiving the switch-on or switch-off control signal modulated by the connection detecting module.

The battery connection enable switch-off module is implemented by a MOS tube or a transistor.

After the battery circuit is switched on, internal resistance of the battery connection enable switch-off module is not greater than 100 milliohms The present invention further provides a method for saving power of a data card with a battery comprising:

detecting whether the data card is connected to a computer, and controlling switch-on of a battery circuit of the data card when determining that the data card is connected to the computer, and controlling switch-off of the battery circuit of the data card when determining that the data card is disconnected from the computer.

Detecting whether the data card is connected to the computer comprises:

the connection detecting module determining whether the data card is connected to the computer effectively by detecting whether a voltage of an computer interface is valid, wherein it is shown that the data card is connected to the computer if a detected voltage signal of the computer interface is high, it is shown that the data card is not connected to the computer if a detected voltage signal of the computer interface is low.

Controlling switch-on or switch-off of the battery circuit of the data card comprises:

the connection detecting module modulating a power supply voltage of the computer interface into a switch-on or switch-off control signal when detecting that the data card is connected to or disconnected from the computer, the switch-on or switch-off control signal controlling the battery connection enable switch-off module to switch on or off the battery circuit of the data card.

The battery connection enable switch-off module is implemented by a MOS tube or a transistor.

In the switch device of the data card with the battery and the method for saving power of the data card with the battery in accordance with the present invention, the connection detecting module detects whether the data card is connected to the computer, and controls the battery connection enable switch-off module to switch on the battery circuit of the data card when determining that the data card is connected to the computer and controls the battery connection enable switch-off module to switch off the battery circuit of the data card when determining that the data card is disconnected from the computer. In the present invention, by the combined use of the connection detecting module and the battery connection enable switch-off module, the battery circuit of the data card can be switched off timely when the data card is in use so as to avoid static power consumption of the battery and save electric quantity of the battery.

Furthermore, in the present invention, both switch-on and switch-off of the battery circuit of the data card are implemented by internal modules without manual operations, therefore, the original on/off button is not required to be set, which can simplify appearance design of the data card and is convenient for users to use.

PREFERRED EMBODIMENTS OF THE PRESENT INVENTION

The basic idea of the present invention is to detect whether a data card is connected to a computer, and control switch-on of a battery circuit of the data card when determining that the data card is connected to the computer, and control switch-off of the battery circuit of the data card when determining that the data card is disconnected from the computer.

The present invention will be further described in detail in combination with the accompany drawings and specific embodiments below.

Figure 1:
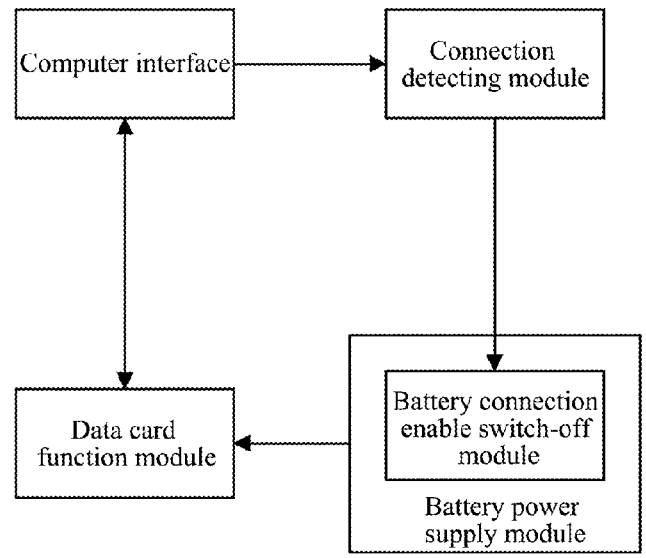
FIG. 1 is a block diagram of a data card with a battery according to the present invention.

FIG. 1 is a block diagram of a data card with a battery according to the present invention. As shown in FIG. 1, the data card comprises an existing computer interface, a data card function module and a battery power supply module, and further comprises a switch device comprised of a connection detecting module and a battery connection enable switch-off module.

The connection detecting module is configured to detect whether the data card is connected to a computer, and control the battery connection enable switch-off module to switch on a battery circuit of the data card when determining that the data card is connected to the computer, and control the battery connection enable switch-off module to switch off the battery circuit of the data card when determining that the data card is disconnected from the computer.

Specifically, the connection detecting module determines whether the data card is connected to the computer effectively by detecting whether a voltage of the computer interface is valid, and modulates a power supply voltage of the computer interface into a switch-on control signal when determining that the data card is connected to the computer to control the battery connection enable switch-off module to switch on the battery circuit of the data card, and modulates the power supply voltage of the computer interface into a switch-off control signal when the data card is disconnected from the computer to control the battery connection enable switch-off module to switch off the battery circuit of the data card.

In practical applications, a modulating circuit by which the connection detecting module modulates control signals can be implemented by a divider resistor. The modulated control signals are voltage signals obtained after the power supply voltage of the computer interface is divided by the divider resistor. Accordingly, the switch-on control signal is a voltage signal which satisfies normal operation of the battery connection enable switch-off module; and the switch-off control signal is a voltage signal which does not satisfy normal operation of the battery connection enable switch-off module, that is to say, the modulated voltage signal is less than the voltage signal at which the battery connection enable switch-off module operates normally.

The battery connection enable switch-off module is configured to switch on or off the battery circuit of the data card under control of the connection detecting module.

Specifically, when receiving the switch-on control signal modulated by the connection detecting module, the battery connection enable switch-off module switches on the battery circuit of the data card; and when receiving the switch-off control signal modulated by the connection detecting module, the battery connection enable switch-off module switches off the battery circuit of the data card.

In practical applications, the battery connection enable switch-off module can be implemented by a MOS tube or a transistor.

Here, the internal resistance after the battery connection enable switch-off module switches on the battery circuit of the data card is required to be extremely low and should be negligible, so as to decrease power consumption of the battery connection enable switch-off module as much as possible. Taking a MOS tube as an example, the internal resistance of a common MOS tube is from tens of milliohms to 200 or 300 milliohms As for the present invention, a MOS tube with internal resistance of less than 100 milliohms, such as 50 or 60 milliohms, can be used.

In the present invention, the battery connection enable switch-off module is a part of the battery circuit, which, in turn, is a part of a battery power supply module. Only after the battery connection enable switch-off module switches on the battery circuit, the battery power supply module can supply power for the data card function module of. In FIG. 1, only a relationship between the battery connection enable switch-off module and battery power supply module is illustrated, and a specific structure of the battery circuit in the battery power supply module is not illustrated.

Functions of the existing computer interface, data card function module and battery power supply module will be described below in brief.

The computer interface, including, but not limited to a USB interface, is configured to connect a data card with a computer.

The data card function module is configured to implement basic functions of the data card, and exchange data between computers via the computer interface. The data card function module supports various communication systems, including, but not limited to Wideband Code Division Multiple Access (WCDMA), Time Division-Synchronous Code Division Multiple Access (TD-CDMA), Worldwide Interoperability for Microwave Access (WiMAX), GSM, General Packet Radio Service (GPRS) or LTE.

The battery power supply module is configured to manage power supply and charge the battery after the battery connection enable switch-off module switches on the battery circuit. Since the data card is required to be connected to the computer, the power of the data card comes from the computer interface first. Sufficient current coming from the computer interface is supplied to the data card function module and charges the battery. When the current from the computer interface can not satisfy both power supplying of the data card function module and charging of the battery, the data card function module's requirement for the current is first guaranteed, and then the remaining current charges the battery. When the current from the computer interface is less than the current required by the data card function module, the short current is supplemented by the battery. The functions described above can guarantee that the computer interface has priority to the battery in supplying power for the data card, that is, if the current is not enough when the data card transmits data, the battery offers a necessary supplement to the data card.

Here, the process of charging the battery belongs to the prior art and will not be described in detail.

Figure 2:
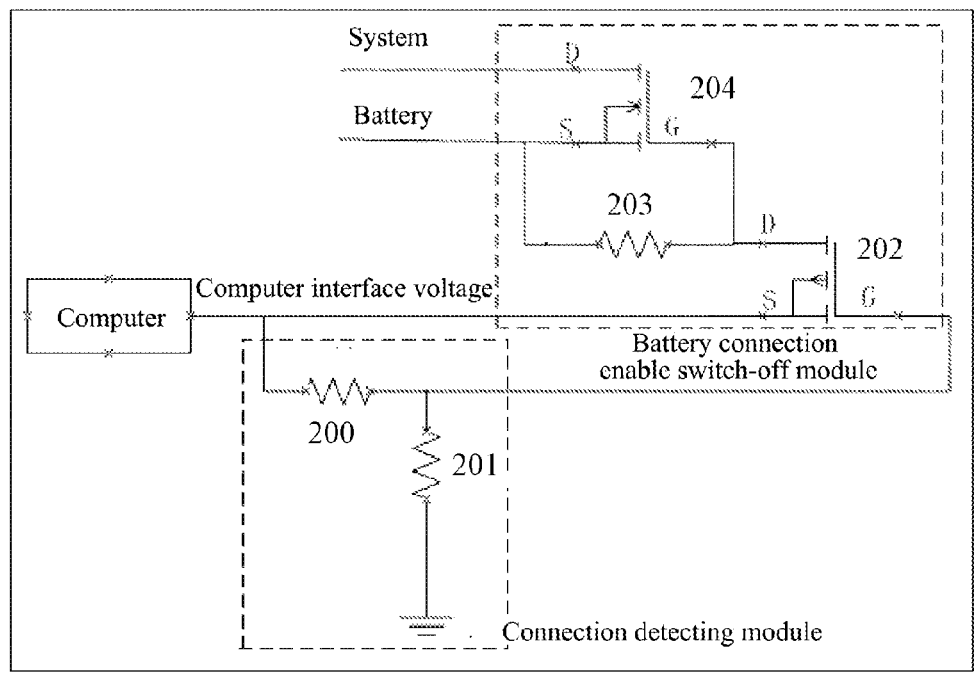
FIG. 2 is a schematic diagram of internal structures of a connection detecting module and a battery connection enable switch-off module according to an embodiment of the present invention.

Internal structures of a connection detecting module and a battery connection enable switch-off module in accordance with the present invention will be described in combination with a specific embodiment below. As shown in FIG. 2, the connection detecting module is composed of 200 and 201, and the battery connection enable switch-off module is composed of 202, 203 and 204.

200 and 201 are two resistors which can divide a voltage using different resistances according to different interface voltages of an external computer to modulate the voltage into a voltage within the interval range of the operating voltage of the battery connection enable switch-off module. This design is easy to implement for those skilled in the art and will not be described in detail here.

202 is a PMOS tube. When the data card is inserted into the computer interface, the S terminal voltage of the PMOS tube 202 is a voltage of the computer interface and is provided a G terminal after being divided by two resistors 200 and 201. When the G terminal voltage is less than the S terminal voltage, the PMOS tube 202 is switched on. After the PMOS tube 202 is switched on, its D terminal voltage approximates to the voltage of the computer interface and generates voltage difference on the resistor 203. 204 is a NMOS tube. The NMOS tube is switched on when its G terminal voltage is greater than its S terminal voltage. A grounding terminal of a single plate is connected to a negative terminal of a battery, and the battery and a data card function module form a closed circuit to implement power-up of the data card function module by the battery. When the data card is pulled out from the computer, both the S terminal and G terminal of the PMOS tube 202 are low such that the PMOS tube 202 can not be switched on, thus the NMOS tube 204 can not be switched on as well, thereby cutting off a current return path of the battery.

Figure 3:
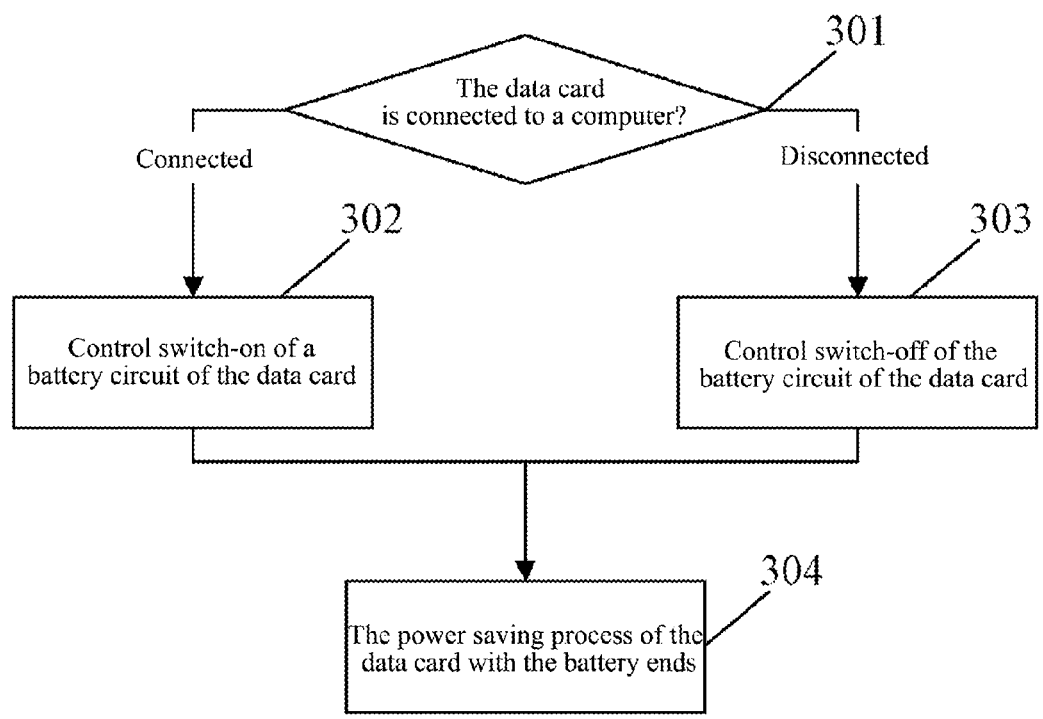
FIG. 3 is a flow chart of a method for saving power of a data card with a battery according to the present invention.

FIG. 3 is a flow chart of a method for saving power of a data card with a battery according to the present invention. As shown in FIG. 3, steps for implementing the method are as follows.

In step 301, whether the data card is connected to a computer is detected, and if the data card is connected to the computer, step 302 is executed; otherwise, step 303 is executed.

Specifically, a connection detecting module within the data card determines whether the data card is connected to the computer effectively by detecting whether a voltage of a computer interface voltage is valid, that is, if a detected voltage signal of the computer interface is high (1), indicating that the data card is connected to the computer, then step 302 is executed; and if the detected voltage signal of the computer interface is low (0), indicating that the data card is disconnected from the computer, then step 303 is executed.

For example, assuming that the data card is connected to the computer via a USB interface, when the data card is inserted into the computer, the connection detecting module detects a 5V voltage signal of the USB interface, indicating that the data card is connected to the computer; when the data card is pulled out from the computer, the connection detecting module can not detect the voltage signal of the USB interface, that is, the detected voltage signal is 0V, indicating that the data card is disconnected from the computer.

In step 302, switch-on of a battery circuit of the data card is controlled, and then step 304 is executed.

Specifically, when detecting that the data card is connected to the computer, the connection detecting module modulates a power supply voltage of the computer interface into a switch-on control signal to control the battery connection enable switch-off module to switch on the battery circuit of the data card, so as to implement power-up of a data card function module, and then step 304 is executed.

Here, the battery connection enable switch-off module is equivalent to a switch, one terminal of which is connected to a negative terminal of the battery, and the other terminal is connected to a grounding terminal of a single plate. Close and open of the switch are controlled by the switch-on control signal or switch-off control signal modulated by the connection detecting module. When the switch is closed, the power supply circuit of the battery is switched on.

In step 303, switch-off of the battery circuit of the data card is controlled, and then step 304 is executed.

Specifically, when detecting that the data card is disconnected from the computer, the connection detecting module modulates the power supply voltage of the computer interface into a switch-off control signal to control the battery connection enable switch-off module to switch off the battery circuit of the data card, so as to implement power-up of the data card function module, and then step 304 is executed.

In step 304, the power saving process of the data card with the battery ends.

The above description is only the preferred embodiments of the present invention and is not intended to limit the protection scope of the present invention. Any modification, equivalent substitution and variation made within the spirit and principle of the present invention should be covered in the protection scope of the appended claims of the present invention.

What is claimed is:

1. A switch device of a data card with a battery power supply module comprising: a connection detecting module and a battery connection enable switch-off module inside the battery power supply module; wherein the connection detecting module is configured to detect whether the data card is connected to a computer via a computer interface of the data card, and control the battery connection enable switch-off module to switch on a battery circuit of the data card when determining that the data card is connected to the computer, and control the battery connection enable switch-off module to switch off the battery circuit of the data card when determining that the data card is disconnected from the computer; and the battery connection enable switch-off module is configured to switch on or off the battery circuit of the data card under control of the connection detecting module.

2. The switch device of the data card with the battery power supply module according to claim 1, wherein the connection detecting module detecting whether the data card is connected to the computer comprises:

the connection detecting module determining whether the data card is connected to the computer effectively by detecting whether a voltage of a computer interface is valid.

3. The switch device of the data card with the battery power supply module according to claim 2, wherein the connection detecting module controlling the battery connection enable switch-off module to switch on or off the battery circuit of the data card comprises:

the connection detecting module modulating a power supply voltage of the computer interface into a switch-on or switch-off control signal, the switch-on or switch-off control signal controlling the battery connection enable switch-off module to switch on or off the battery circuit of the data card.

4. The switch device of the data card with the battery power supply module according to claim 2, wherein the battery connection enable switch-off module is implemented by a MOS tube or a transistor.

5. The switch device of the data card with the battery power supply module according to claim 2, wherein after the battery circuit is switched on, internal resistance of the battery connection enable switch-off module is not greater than 100 milliohms.

6. The switch device of the data card with the battery power supply module according to claim 1, wherein the connection detecting module controlling the battery connection enable switch-off module to switch on or off the battery circuit of the data card comprises:

the connection detecting module modulating a power supply voltage of the computer interface into a switch-on or switch-off control signal, the switch-on or switch-off control signal controlling the battery connection enable switch-off module to switch on or off the battery circuit of the data card.

7. The switch device of the data card with the battery power supply module according to claim 6, wherein the battery connection enable switch-off module switching on or off the battery circuit of the data card under the control of the connection detecting module comprises:

the battery connection enable switch-off module switching on or off the battery circuit of the data card when receiving the switch-on or switch-off control signal modulated by the connection detecting module.

8. The switch device of the data card with the battery power supply module according to claim 1, wherein the battery connection enable switch-off module is implemented by a MOS tube or a transistor.

9. The switch device of the data card with the battery power supply module according to claim 1, wherein after the battery circuit is switched on, internal resistance of the battery connection enable switch-off module is not greater than 100 milliohms.

10. A method for saving power of a data card with a battery power supply module comprising:

detecting whether the data card is connected to a computer via a computer interface of the data card, and controlling switch-on of a battery circuit of the data card when determining that the data card is connected to the computer, and controlling switch-off of the battery circuit of the data card when determine that the data card is disconnected from the computer, wherein a battery connection enable switch-off module is configured to switch on or off the battery circuit of the data card under control of a connection detecting module, and wherein controlling switch-on or switch-off of the battery circuit of the data card comprises the connection detecting module modulating a power supply voltage of the computer interface into a switch-on or switch-off control signal when detecting that the data card is connected to or disconnected from the computer, the switch-on or switch-off control signal controlling the battery connection enable switch-off module to switch on or off the battery circuit of the data card.

11. The method according to claim 10, wherein detecting whether the data card is connected to the computer comprises:

the connection detecting module determining whether the data card is connected to the computer effectively by detecting whether a voltage of the computer interface is valid, wherein it is shown that the data card is connected to the computer if a detected voltage signal of the computer interface is high, it is shown that the data card is not connected to the computer if a detected voltage signal of the computer interface is low.

12. The method according to claim 10, wherein the battery connection enable switch-off module is implemented by a MOS tube or a transistor.

* * * * *